(12) United States Patent
Gas et al.

(10) Patent No.: US 8,008,834 B2
(45) Date of Patent: Aug. 30, 2011

(54) TOOTHED-ROTOR SHAFT, TOOTHED ROTOR EQUIPPED WITH SUCH A SHAFT AND ROTARY ELECTRICAL MACHINE EQUIPPED WITH SUCH A ROTOR

(75) Inventors: Olivier Gas, Paris (FR); Alexandre Pfleger, Noisy le Grand (FR)

(73) Assignee: Valeo Equipments Electriques Moteur, Creteil (FR)

( * ) Notice: Subject to any disclaimer, the term of this patent is extended or adjusted under 35 U.S.C. 154(b) by 63 days.

(21) Appl. No.: 12/441,096

(22) PCT Filed: Sep. 13, 2007

(86) PCT No.: PCT/FR2007/051927
§ 371 (c)(1),
(2), (4) Date: Aug. 7, 2009

(87) PCT Pub. No.: WO2008/031995
PCT Pub. Date: Mar. 20, 2008

(65) Prior Publication Data
US 2010/0013351 A1    Jan. 21, 2010

(30) Foreign Application Priority Data
Sep. 13, 2006 (FR) ...................................... 06 53720

(51) Int. Cl.
*H02K 19/22* (2006.01)
*H02K 1/22* (2006.01)

(52) U.S. Cl. ............ 310/263; 310/194; 310/234; 310/79

(58) Field of Classification Search .................... 310/79, 310/194, 234, 263; 464/179; *H02K 1/22*, *H02K 19/22*
See application file for complete search history.

(56) References Cited

U.S. PATENT DOCUMENTS

| 3,271,604 A | * | 9/1966 | Priddy | 310/234 |
| 3,590,294 A | * | 6/1971 | Inagaki et al. | 310/92 |
| 3,603,825 A | * | 9/1971 | Sheridan et al. | 310/194 |
| 4,377,762 A | * | 3/1983 | Tatsumi et al. | 310/263 |
| 4,588,911 A | * | 5/1986 | Gold | 310/62 |
| 4,588,915 A | * | 5/1986 | Gold et al. | 310/194 |
| 4,611,139 A | * | 9/1986 | Godkin et al. | 310/266 |
| 4,886,392 A | * | 12/1989 | Iio | 403/282 |
| 5,625,511 A | * | 4/1997 | Brooks et al. | 360/99.08 |

(Continued)

FOREIGN PATENT DOCUMENTS

| DE | 30 08 454 | 9/1980 |
| EP | 0 866 541 | 9/1998 |

*Primary Examiner* — Quyen Leung
*Assistant Examiner* — John K Kim
(74) *Attorney, Agent, or Firm* — Berenato & White, LLC

(57) ABSTRACT

The claw-pole-rotor shaft has a front end with a radially larger-sized section, two knurled regions known as crimping regions, intended to be assembled with the claw-pole rotor by local deformation of the material of the claw-pole rotor, and a centring region for centring the claw-pole rotor, the crimping regions being positioned on each side of the centring region while the centring region projects radially with respect to the crimping regions of the shaft, these themselves projecting radially with respect to the section of larger radial size at the front end of the shaft. The claw-pole rotor is characterized in that it is equipped with such a shaft while the rotary electrical machine is characterized in that it is equipped with such a rotor.

22 Claims, 9 Drawing Sheets

U.S. PATENT DOCUMENTS

| | | | |
|---|---|---|---|
| 5,747,913 A * | 5/1998 | Amlee et al. | 310/263 |
| 2002/0047485 A1 * | 4/2002 | Okawa | 310/263 |
| 2005/0119077 A1 * | 6/2005 | Faucon et al. | 474/70 |
| 2008/0315714 A1 * | 12/2008 | Badey et al. | 310/261 |
| 2010/0013351 A1 * | 1/2010 | Gas et al. | 310/263 |

\* cited by examiner

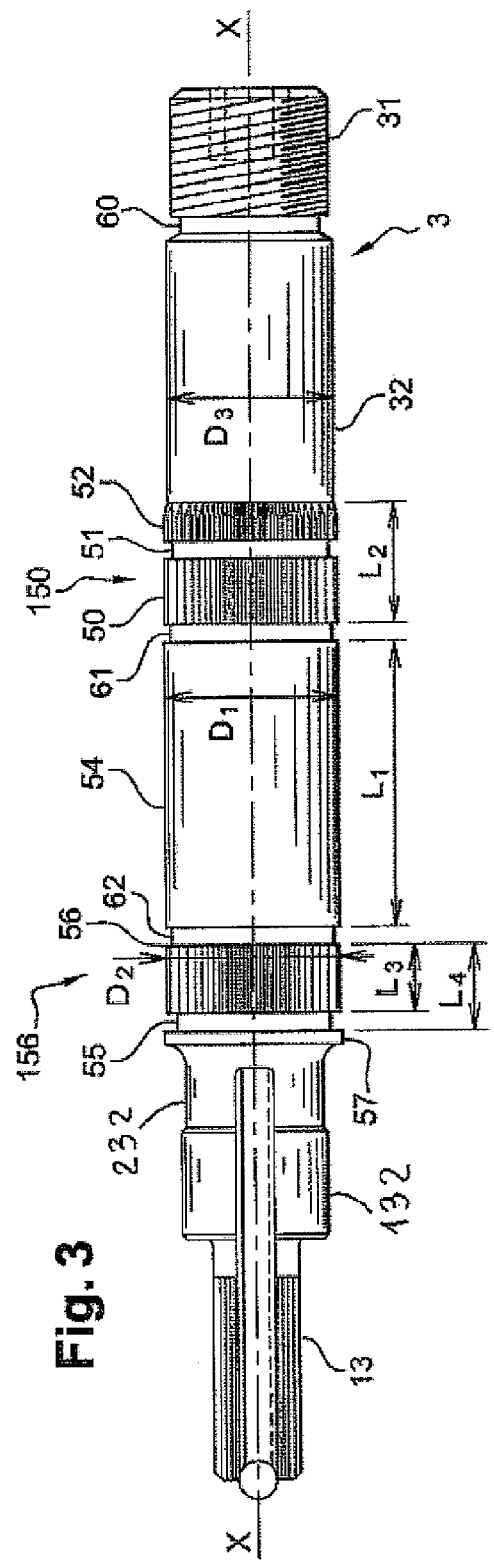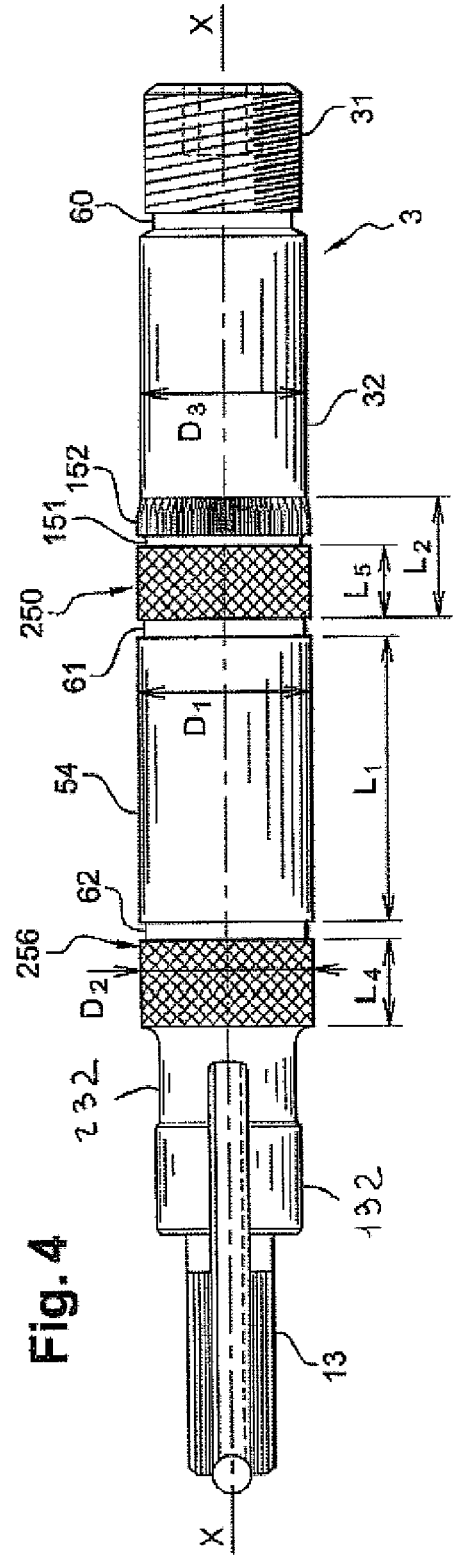

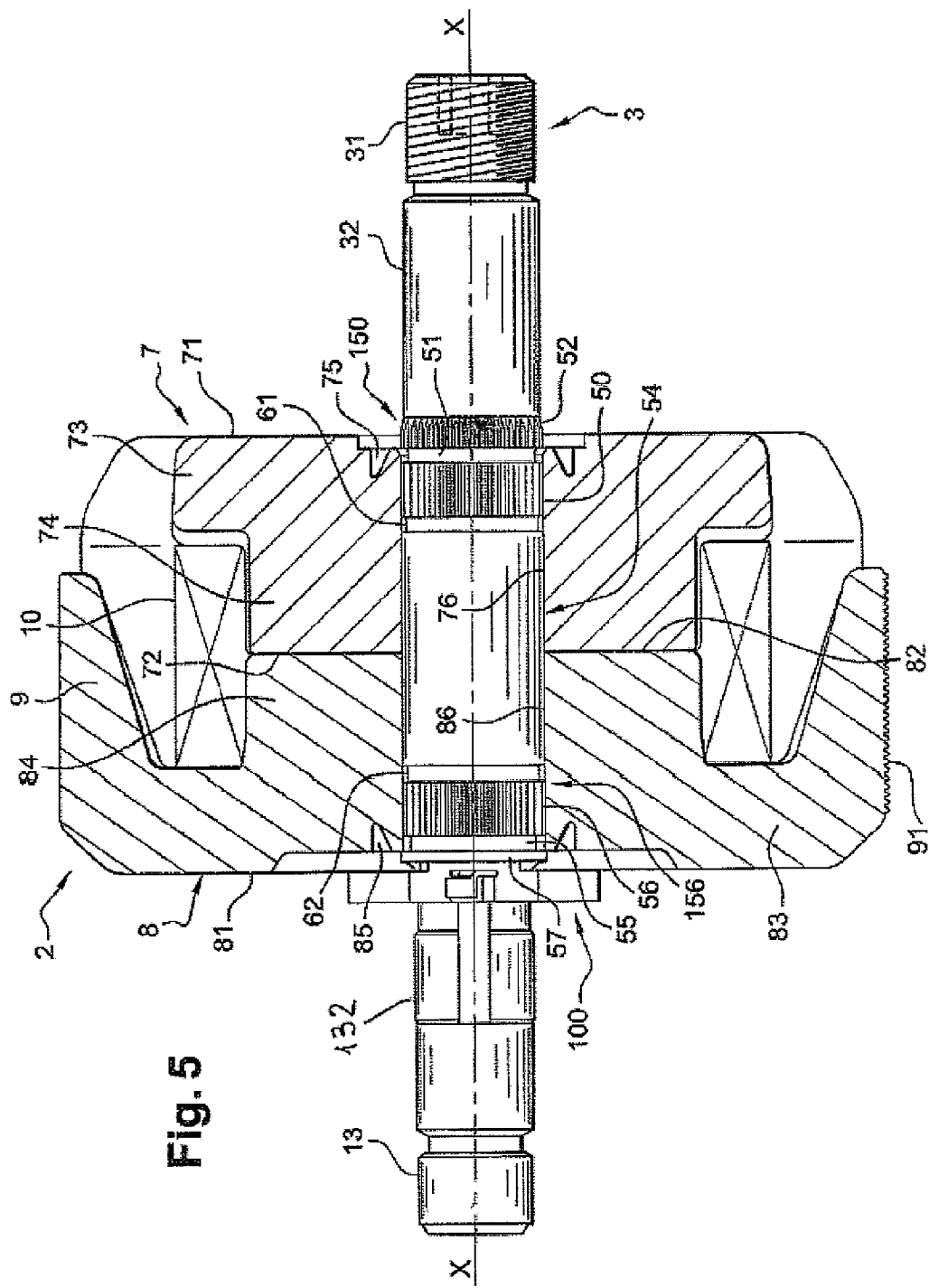

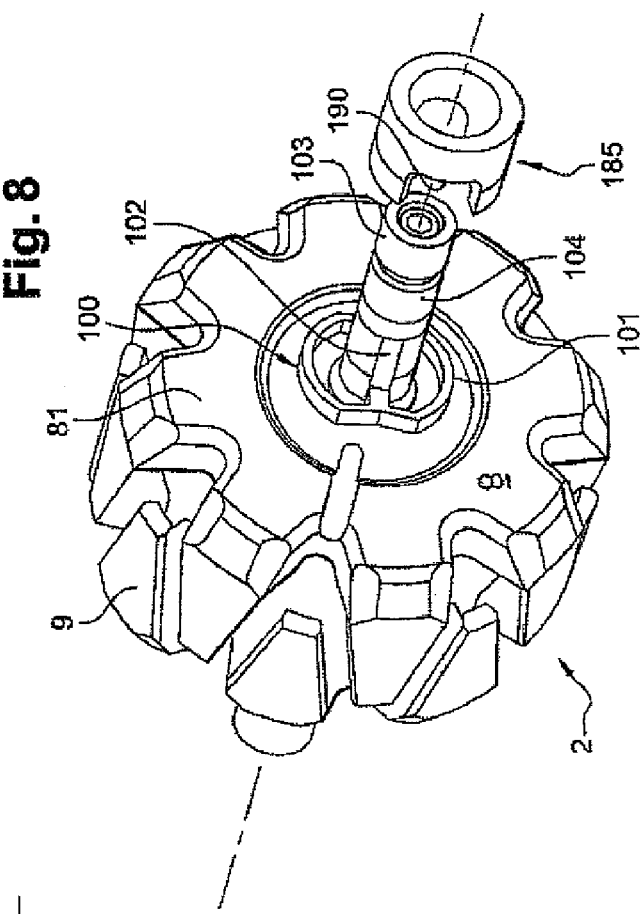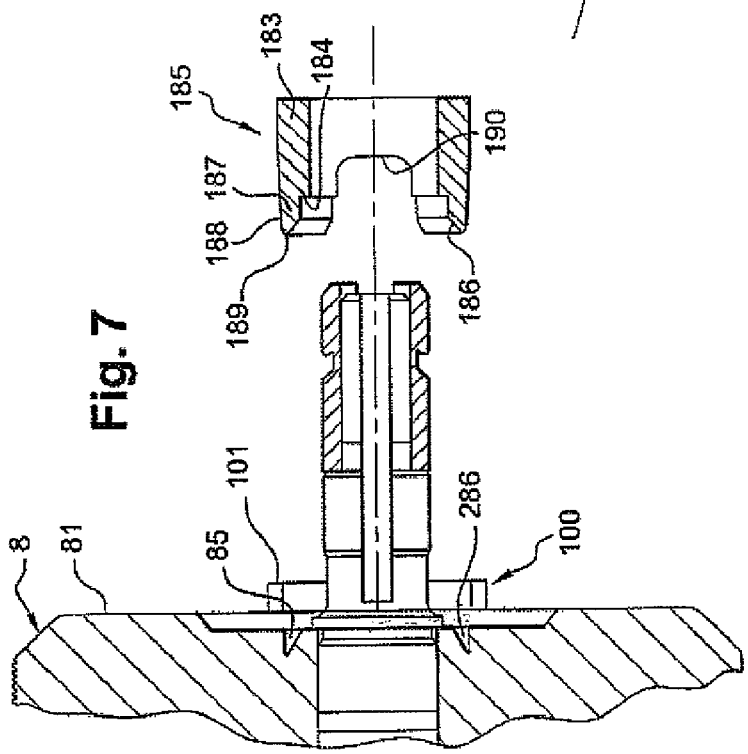

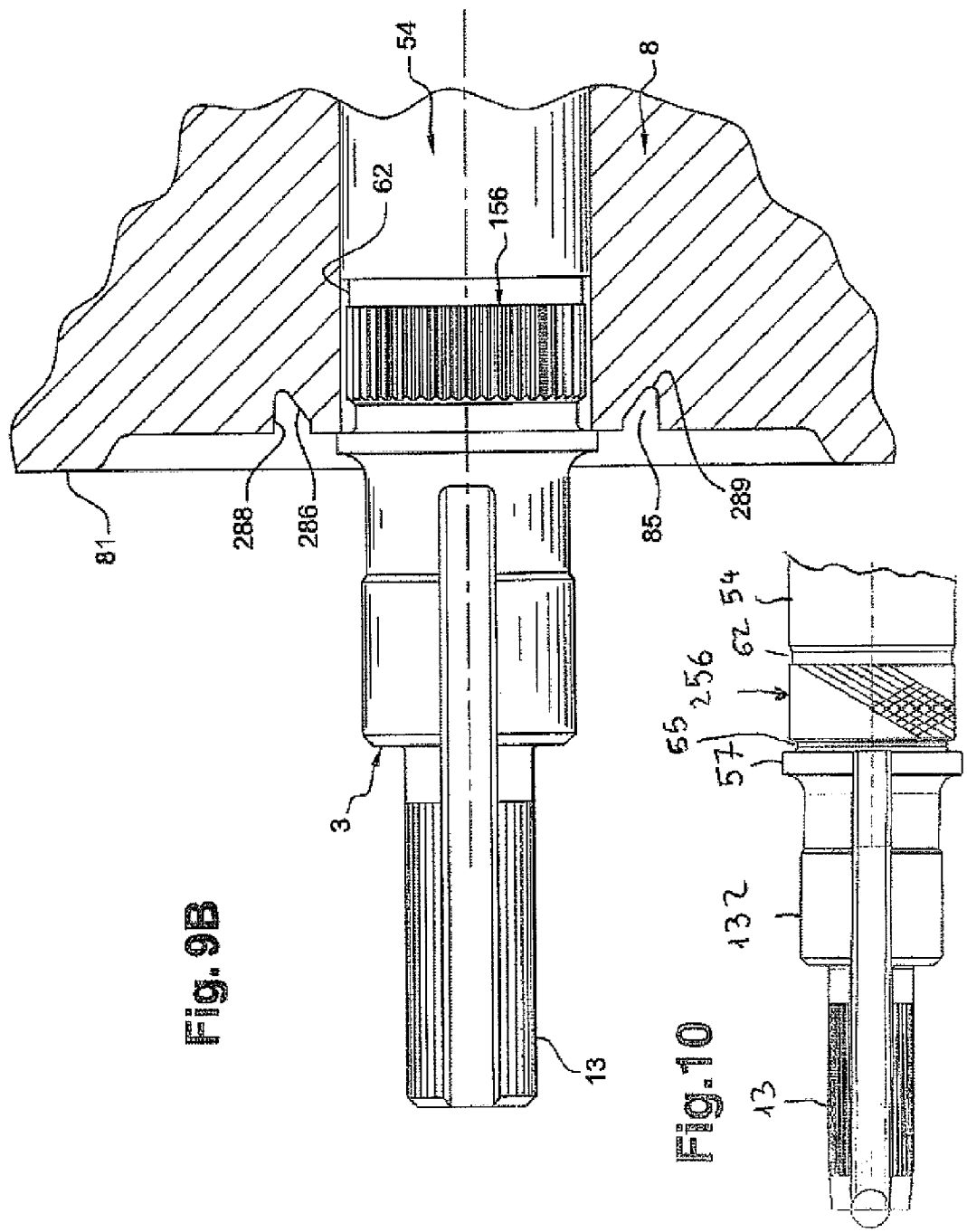

US 8,008,834 B2

TOOTHED-ROTOR SHAFT, TOOTHED ROTOR EQUIPPED WITH SUCH A SHAFT AND ROTARY ELECTRICAL MACHINE EQUIPPED WITH SUCH A ROTOR

CROSS-REFERENCE TO RELATED APPLICATIONS AND CLAIM TO PRIORITY

This application relates to International Application No. PCT/FR2007/051927 filed Sep. 13, 2007 and French Patent Application No. 0653720 filed Sep. 13, 2006, of which the disclosures are incorporated herein by reference and to which priority is claimed.

FIELD OF THE INVENTION

The invention concerns a claw-pole rotor shaft, a claw-pole rotor equipped with such a shaft and a rotating electrical machine equipped with such a rotor.

STATE OF THE ART

Many rotating electrical machines are equipped with a claw-pole rotor.

For example, there is described hereinafter with reference to FIG. 1 one such machine in the form of a compact multiphase alternator, in particular for automobile vehicles. This alternator converts mechanical energy into electrical energy and can be reversible. Such reversible alternators are called alternator-starters and in another mode of operation convert electrical energy into mechanical energy, in particular for starting the internal combustion engine of the vehicle.

This machine essentially includes a casing 1 and, inside the latter, a claw-pole rotor 2, which is constrained to rotate with a shaft 3, and a stator 4, which surrounds the rotor with a small airgap and includes a body in the form of a stack of laminations with cut-outs, here of the semi-closed type, equipped with cut-out insulation for mounting the phases of the stator, each including at least one winding forming a bun-shaped assembly 5 on either side of the stator.

The windings are produced from continuous enameled wire, for example, or from conductive members in the form of rods, such as hairpin members connected together by welding, for example.

These windings are three-phase windings, for example, connected in a star or delta configuration, the outputs of which are connected to at least one rectifier bridge including rectifier components such as diodes or MOSFET-type transistors, in particular in the case of an alternator-starter as described in the document FR A 2 745 445 (U.S. Pat. No. 6,002,219), for example.

The number of phases depends on the application and can be more than three, and one or two rectifier bridges can be provided.

The claw-pole rotor 2 (FIGS. 1 and 2) includes two pole wheels 7, 8 axially juxtaposed and of annular shape each having a transverse flange provided at its external periphery with teeth 9 of trapezoidal shape directed axially towards the flange of the other pole wheel, the teeth of one pole wheel entering the space between two adjacent teeth 9 of the other pole wheel, with the result that the teeth of the pole wheels are interleaved.

The flanges of the wheels 7, 8 are of annular shape and have at their external periphery radial projections (no reference numbers) connected by chamfers to the teeth 9. These projections and the teeth 9 form claws. The number of teeth 9 depends on the application and in particular on the number of stator phases. In FIG. 2 there are eight teeth per pole wheel. Alternatively, each pole wheel has six or seven teeth.

A cylindrical core is inserted axially between the flanges of the wheels 7, 8. Here this core consists of two half-cores, one for each of the flanges.

This core carries an excitation winding 10 at its external periphery. An insulator, such as a bobbin supporting the winding 10, is interleaved radially between the core and the winding 10.

The shaft 3 of the rotor 2 carries at its front end a drive member, such as a pulley 12 that is part of a transmission system for transmitting motion to at least one belt between the alternator and the internal combustion engine of the automobile vehicle, and at its rear end 13, which is of smaller diameter, slip rings connected by connecting wires to the ends of the excitation winding of the rotor. The connecting wires and the slip rings are here part of an attached collector of the type described in the document FR 2 710 197. Brushes on a brush support 14 are disposed so as to rub on the slip rings. The brush support is connected to a voltage regulator. Thus the front and rear ends of the shaft 3 each comprise a number of sections.

When the excitation winding 10 is energised electrically via the brushes, the rotor 2, which is of ferromagnetic material, is magnetised and becomes a field rotor with magnetic poles being formed by the teeth of the pole wheels.

This field rotor 10 induces an alternating current in the stator when the shaft 3 rotates, the rectifier bridge or bridges converting the induced alternating current into a direct current, in particular to feed the loads and the consumer units of the onboard network of the automobile vehicle, and to charge the battery of said vehicle.

The casing 1 carries internally at its external periphery the stator 4 and centrally the rotatable shaft 3. Here this casing is in two parts, namely a front bearing 16 adjacent to the pulley 12 and a rear bearing 17 carrying the brush support, the voltage regulator and at least one rectifier bridge. The bearings are hollow and each includes a respective central ball bearing 19 and 20 for rotatably mounting the shaft 3 of the rotor 2. The diameter of the bearing 19 is greater than that of the bearing 20.

FIG. 1 shows at the external periphery of the body of the stator 4 an elastic system for filtering vibrations, with a flat seal 40 at the front and buffers 41 at the rear, a flexible heat-conducting resin between the front bearing and the body of the stator evacuating heat. Alternatively, the bearings 16, 17 carry the body of the stator 4 rigidly.

In FIG. 1, the bearings are perforated to enable cooling of the alternator by circulation of air. To this end, the rotor 2 carries at least one or both of its axial ends a fan for circulating air in this way. In the example shown, a fan 23 is provided on the front ventral face of the rotor and another, more powerful fan 24 is provided on the rear dorsal face of the rotor, each fan including a plurality of blades 25, 26.

The power of the machine can be further increased by using higher performance fans such as fans produced by superposing two individual fans each having a series of blades, as described, for example, in the document FR A 2 741 912, and as can be seen in FIG. 1 in the case of the rear fan 24.

Alternatively, the alternator can be water-cooled, the casing then being configured to include an appropriate passage for circulation of water.

The performance, i.e. the power and the efficiency, of the rotating electrical machine can be further increased by using a rotor having the configuration shown in FIG. 2. This rotor includes, for example, and as described by way of example in French patents 2 793 085 and 2 784 248, a number of permanent magnets 38 symmetrically disposed relative to the axis of the rotor and interleaved between two adjacent teeth 9 at the internal periphery of the stator.

In FIG. 2 there are four pairs of magnets 38 for eight pairs of poles.

Alternatively, the number of magnets is equal to the number of pole pairs.

The shaft 3 and the pole wheels 7, 8 are here made of steel, the pole wheels being made of mild steel and the shaft 3 of harder steel.

This type of machine is therefore satisfactory.

A problem nevertheless arises as the shaft 3 and the pole wheels 7, 8 are fastened together by force-fitting the harder shaft 3 into the internal bores of the wheels 7, 8, the shaft 3 having for this purpose knurled portions projecting radially and of unequal length (no reference numbers in FIG. 1).

To be more precise, the shaft 3 has a smooth intermediate portion between its two knurled projecting portions. The diameter of this smooth intermediate portion is equal to that of the front end portion of the shaft on which the bearing 19 is mounted. The rear end portion of the shaft 3 is of smaller diameter. There is a radial clearance between the internal periphery of the pole wheel 8 and the external periphery of the smooth intermediate section.

The axial length of this smooth intermediate section is less than that of the knurled portions.

Prior to this force-fitting operation, the wheels 7, 8 are pressed together, in particular for efficient transfer of the magnetic flux.

The consequence of this is to reduce the interior diameter of the pole wheels, with the result that the force necessary to force-fit the shaft is increased.

As a result there is a risk of the shaft buckling, given that the rear end portion of this shaft is of smaller diameter, for mounting the slip rings.

Furthermore, the splines of the knurled portions are never oriented in an axial direction in a perfectly rectilinear manner, but are generally of helicoidal shape, which produces torsion stresses liable to cause relative rotation of the pole wheels when the pressure force on them is released.

Moreover, the non-uniform deformations generated on force fitting the shaft with these knurled portions into the pole wheels prevent sufficiently accurate concentricity of the pole wheels relative to the axis of the shaft to be achieved, with the result that it is necessary to carry out an operation of machining the external periphery of the teeth of the pole wheels to guarantee a small airgap between the rotor and the stator and accurate concentricity of the external periphery of the teeth and the axis of the shaft.

The same applies if the alternator is of the brushless type (see for example the document FR 2 744 575). In this case, the claw-pole rotor includes a staged main pole wheel carrying at its external periphery, via an amagnetic ring, the teeth of the other pole wheel, which has no flange, the excitation winding being carried by a fixed core.

In the document DE 300 84 54 the knurled portions from FIG. 1 are replaced by grooves with axial splines on the bottom, as seen more clearly in FIG. 4 of the document. The material of the pole wheels is deformed so that it enters the grooves. Note that the axial splines at the bottom of the short axial grooves are difficult to machine.

OBJECT OF THE INVENTION

An object of the present invention is to overcome these drawbacks.

According to the invention, a shaft for a claw-pole rotor of the above type, having a front end portion with a plurality of sections, a rear end portion and an intermediate section for supporting and fixing the claw-pole rotor having, on the one hand, two knurled areas, called crimping areas, adapted to be assembled with the claw-pole rotor by local deformation of the material of the claw-pole rotor (2), and, on the other hand, a centring area between the crimping areas adapted to centre the claw-pole rotor and projecting radially relative to the crimping areas, is characterised in that the crimping areas project radially relative to the section of the front end portion of the shaft of radially larger size.

In one embodiment, the rotating electrical machine being of the brushless type, the crimping areas are assembled with the axial ends of the main pole wheel.

In another embodiment, the rotating electrical machine including brushes, each crimping area is assembled with one of the pole wheels.

Thanks to the invention, the intermediate support and fixing section is thicker than the front end of the shaft, with the result that the shaft is mechanically strong.

Furthermore, the crimping areas are easier to machine because they project radially relative to the front end portion of the shaft.

At least one of the crimping areas can be lengthened to fix another component of the rotating electrical machine, such as the spacer 159 from FIG. 1.

According to the invention, a claw-pole rotor is characterised in that it is equipped with a shaft of the above-indicated type mounted in its central bore.

This rotor is assembled with the shaft by local deformation of material in the crimping areas of the shaft.

In one embodiment, the main wheel of the claw-pole rotor is assembled with the shaft by local deformation of the material of the main pole wheel in the crimping areas of the shaft.

In another embodiment, the pole wheels of the claw-pole rotor are assembled with the shaft by local deformation of the material of the pole wheels in the crimping areas.

This deformation is plastic deformation, the material of the main pole wheel or the pole wheels being caused to flow.

This plastic deformation is generated by the crimping tool.

In one embodiment the main pole wheel or each pole wheel has respective imprints, such as annular imprints, possibly divided, on the ventral face and the dorsal face of the rotor.

Thus in one embodiment, using a frustoconical tool cooperating with the imprint, the material of the pole wheel is pushed inward and toward the crimping area concerned of the shaft.

Alternatively, it is the tool itself that produces the imprint.

According to the invention, a rotating electrical machine is characterised in that it is fixedly equipped with such a claw-pole rotor.

Thanks to the invention, there is no risk of the shaft buckling when it is force-fitted into the main pole wheel or the pole wheels because the crimping areas have a radial size less than that of the centring area, and a centring fit is obtained between the shaft and the respective bore or bores of the main pole wheel and the pole wheels. The mechanical stresses between the shaft and the main pole wheel or the pole wheels are reduced because the material of the main pole wheel or the pole wheels enters the crimping areas.

Thanks to the invention, the general configuration of the main pole wheel or the pole wheels is preserved and advantage is taken of the fact that the main pole wheel or the pole wheels have a hardness lower than that of the shaft, which enables them to become deformed and to cause the material of the main pole wheel or the pole wheels to flow into the crimping areas.

Moreover, machining the internal bore of the pole wheels is simplified because a frustoconical portion at the end of the bore of the half-core of a pole wheel, as in FIG. 1, is no longer needed.

Additionally, accurate and concentric assembly of the pole wheels to the shaft is obtained because of the presence of the centring area of the shaft.

A result of this is that there is no need, after assembly, to carry out an operation of reworking the external periphery of the teeth of the pole wheels.

This external periphery is machined using a toot in advance, i.e. before mounting the excitation winding between the flanges of the pole wheels and on the core, with the result that there is no risk of swarf damaging the excitation winding, which is not present at this stage.

Moreover, the tool can be lubricated, which is not possible if the excitation winding is present.

The configuration of the shaft of the invention makes it easy to mount permanent magnets between two adjacent teeth of the rotor. Thus the magnets can be mounted on one pole wheel and offered up to the other pole wheel in the correct angular position. This configuration will not be modified by inserting the shaft because no torsion stress is produced liable to bring about relative movement of the wheels when the pressure force on the wheels is released.

In one embodiment the crimping areas are each separated from the centring area by separation means such as a groove to protect the centring area and to provide clearance for the tools for machining the knurling of the crimping areas.

In one embodiment the centring area is smooth.

Alternatively, this centring area is divided and includes at least two smooth portions.

In one embodiment the centring area and the crimping areas are of circular section and the outside diameter of the centring area of the shaft is greater than that of the crimping areas.

The section of the front end portion of the shaft that is of radially larger size is also cylindrical and has a diameter less than that of the crimping areas.

Accordingly, before crimping the pole wheels to the crimping areas of the shaft, one of the pole wheels can be turned relative to the other, at this stage in intimate contact with the centring area of the shaft, which is of greater diameter than the crimping areas, without damaging the front end portion of the shaft.

In one embodiment the centring area has a length greater than that of each crimping area.

According to a first embodiment the crimping areas of the shaft include axially oriented splines and each of them is associated with a groove referred to as a crimping groove.

Thus the splines block rotation of the pole wheels relative to the shaft and the grooves block movement in translation of the pole wheels relative to the shaft.

In one embodiment the crimping groove is deeper than the separation groove.

In one embodiment at least one of the grooves is produced in a crimping area.

In a second embodiment that is more economical and offers better performance, the splines cross so that they block movement of the pole wheels relative to the shaft in translation and in rotation.

These embodiments can be considered separately or in combination, of course.

Thus one of the crimping areas can include crossed splines and the other axially oriented splines in combination with a groove produced in this area or adjacent to this area.

BRIEF DESCRIPTION OF THE DRAWINGS

The invention will be better understood and other aims, features, details and advantages of the invention will become more clearly apparent in the course of the following explanatory description with reference to the appended drawings, which are provided by way of example only and illustrate embodiments of the invention, in which drawings:

FIG. 3 is a front view of a first embodiment of the shaft of the claw-pole rotor of the invention;

FIG. 4 is a view analogous to FIG. 3 for a second embodiment of the invention;

FIG. 5 is a view in axial section of the claw-pole rotor equipped with the shaft from FIG. 3 before the operation of crimping the rotor to the crimping areas;

FIG. 7 is a partial view of FIG. 5 showing the crimping tool before it enters the crimping imprint of the rear pole wheel;

FIG. 8 is a perspective view showing the rear pole wheel, the end of the shaft equipped with its attached collector, and the crimping tool before the crimping operation;

FIGS. 9, 9A, 9B are partial views showing the various steps of the operation of crimping the rear pole wheel assembly to the crimping area concerned of the shaft; and FIG. 10 is a partial view analogous to FIG. 4 for a further embodiment.

DESCRIPTION OF EMBODIMENTS OF THE INVENTION

In the figures, identical elements are assigned the same reference signs.

Figure 1:
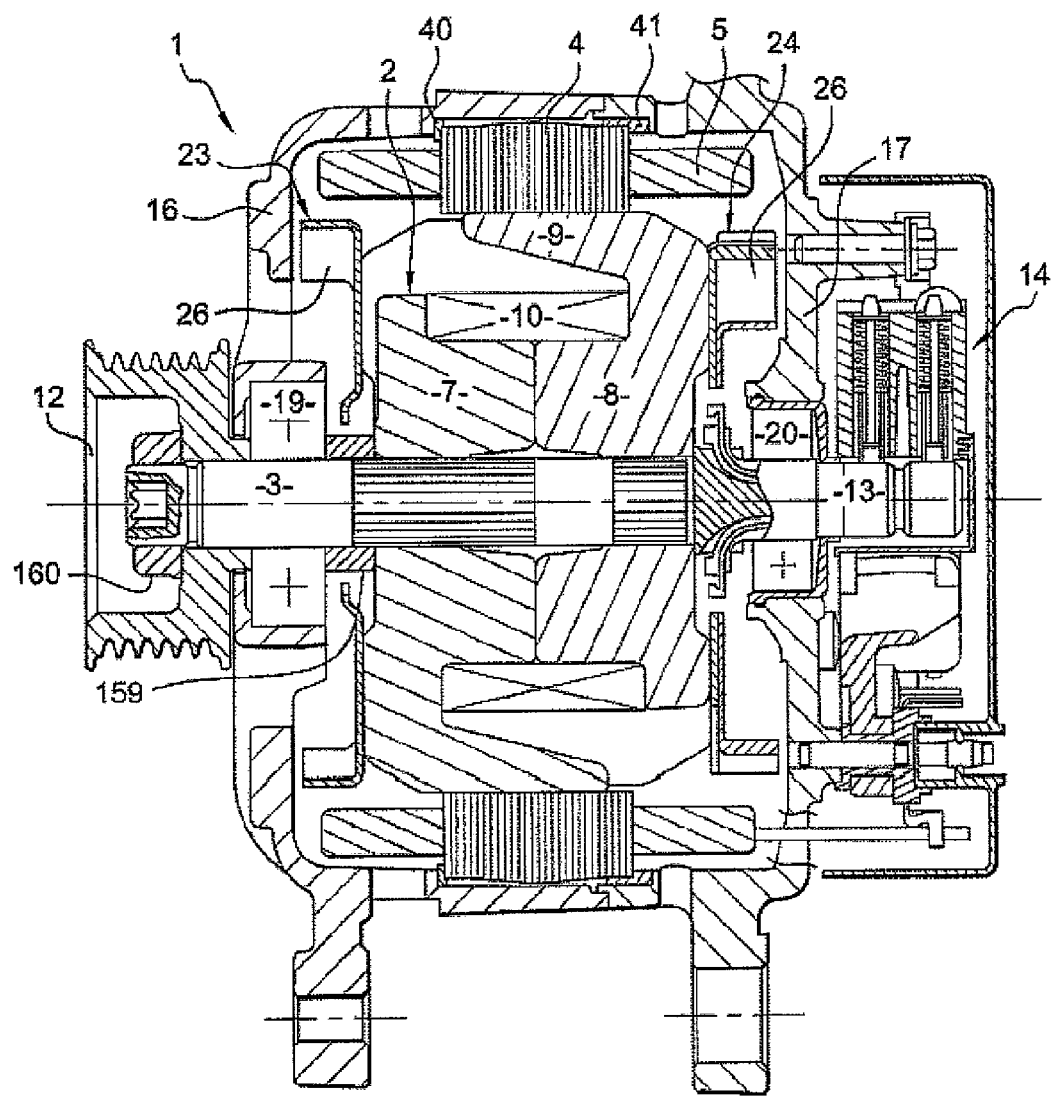
FIG. 1 is a view in axial section of a prior art rotating electrical machine.

In FIGS. 3 and 4 are seen two embodiments of the shaft 3 of the invention intended to be assembled with the pole wheels 7, 8 from FIG. 1.

This shaft, here of metal, has front end portions 31, 60, 32 and a rear end portion 13 identical to those of the shaft from FIG. 1 and an intermediate section for supporting and fixing the pole wheels of the rotor 2.

The shaft 3 is made of a material harder than the pole wheels 7, 8 of the claw-pole rotor 2, also made of metal.

Here the pole wheels 7, 8 are made of mild steel and the shaft 3 is made of steel with a higher carbon content than the wheels 7, 8.

The front end portion of the shaft includes a number of sections one of which is of radially larger size.

To be more precise, the front end portion of the shaft 3 includes a smooth second section 32 for mounting the inner race of the front ball bearing 19 and a groove 60 connecting this second section to a first threaded section 31 for screwing on the nut 160 from FIG. 1.

Here the sections 31, 32 and the shaft 3 are cylindrical.

The second section 32 has a diameter D3 greater than the diameter of the threaded section 31.

The nut 160 clamps the pulley 12, the internal race of the bearing 19 and a spacer 159 between the nut and the front face of the front pole wheel 7.

The rear end portion 13 of the cylindrical shaft 3 is represented in these FIGS. 3 and 4 as well as in FIGS. 6, 9, 9A, 9B without the slip rings and the attached collector from FIG. 1, represented at 100 in FIGS. 5, 7 and 8.

There are seen in FIG. 8 at 103 and 104 the slip rings and at 102 one of the plastic material branches of the collector 100 connected to the ring 101 of the latter, as described in the document FR 2 710 197, which may be referred to.

In this FIG. 8 each pole wheel has six teeth; alternatively it can have seven or eight teeth.

The conductive parts connected to the rings 103, 104 are embedded in the branches 102 and are bared at the location of the ring 101 for connection to the ends of the excitation winding.

It is seen in these FIGS. 3 and 4 that the end portion 13 includes a cylindrical rear end section of smaller diameter than the other sections of the shaft 1.

This end section, called the fourth section, is splined, as can be seen in FIGS. 3 and 4, for force fitting the collector onto the shaft.

This end portion 13 includes diametral grooves through which the branches 102 of the attached collector pass. One of these grooves can be seen in FIGS. 3 and 4 (no reference number).

The rear end portion 13 also includes a third cylindrical section 132 for mounting the inner race of the rear ball bearing 20, which is of smaller diameter than the bearing 19.

The diameter of this third section 132 is greater than that of the fourth section at the end and less than the diameter D3 of the second section 32.

The grooves of the end portion 13 are in the third section 132 and in part of a cylindrical fifth section 232 adjacent to the intermediate section for supporting and fixing the pole wheels.

The diameter of this fifth section 232 is less than that of the third section 132 and greater than that of the fourth section. This fifth section 232 carries the slip ring between the pole wheel 8 and the bearing 20.

The shapes of the front and rear end portions of the shaft depend on the application, of course.

Thus in another embodiment the second section 32 has a splined portion at the front and the internal bore of the metal pulley 12 is also splined for force fitting it to the splined portion of the second section.

Everything depends on the mode of assembly of the pulley 12, which can alternatively be replaced by a toothed wheel.

Likewise, the shape of the rear end portion 13 depends on the shape of the collector.

In another embodiment this rear end portion 13 has no slip ring and no collector, the alternator being of the brushless type and the excitation winding being carried by the casing.

At least one of the sections of the front and rear end portions of the shaft can alternatively have a non-circular section.

The shaft 3 has between its front and rear end portions an intermediate section for fixing and supporting the wheels 7, 8. This intermediate section, and in particular its thickness, is modified to improve the accuracy and concentricity of the assembly of the pole wheels 7, 8 of the claw-pole rotor to the shaft 3.

Advantage is taken of the difference in hardness between the shaft 3 and the pole wheels 7, 8 to cause the material of the pole wheels to flow and to produce a crimped assembly in the manner described hereinafter.

According to one feature, this intermediate section of the shaft 3 has, on the one hand, two knurled areas, called crimping areas, intended to be assembled to the claw-pole rotor by local deformation of the material of the claw-pole rotor and, on the other hand, a centring area. The crimping areas are disposed on either side of the centring area and the centring area projects radially relative to the crimping areas.

The crimping areas also project radially relative to the section 32 of radially larger size of the front end portion of the shaft.

To be more precise, the centring area is dedicated to centring the pole wheels of the claw-pole rotor and each of the crimping areas is dedicated to fixing the pole wheel concerned of the claw-pole rotor.

In FIGS. 3 and 4 there are seen at 54 the centring area and at 61 and 62 front and rear grooves, respectively, that connect the front and rear axial ends of the centring area 54 to the front and rear crimping areas, respectively, as described hereinafter.

Each crimping area is therefore separated from the centring area by separation means, such as a groove, to protect the centring area and to provide clearance for the tool for forming the knurled areas. The depth of the separation means depends on the depth of the knurled portions of the crimping areas.

In FIGS. 3 and 4 the separation grooves 61, 62 are of circular section. This depends on the application, of course, and the section of the grooves can be non-circular.

These grooves do not unduly affect the stiffness or the mechanical strength of the shaft.

Figure 6:
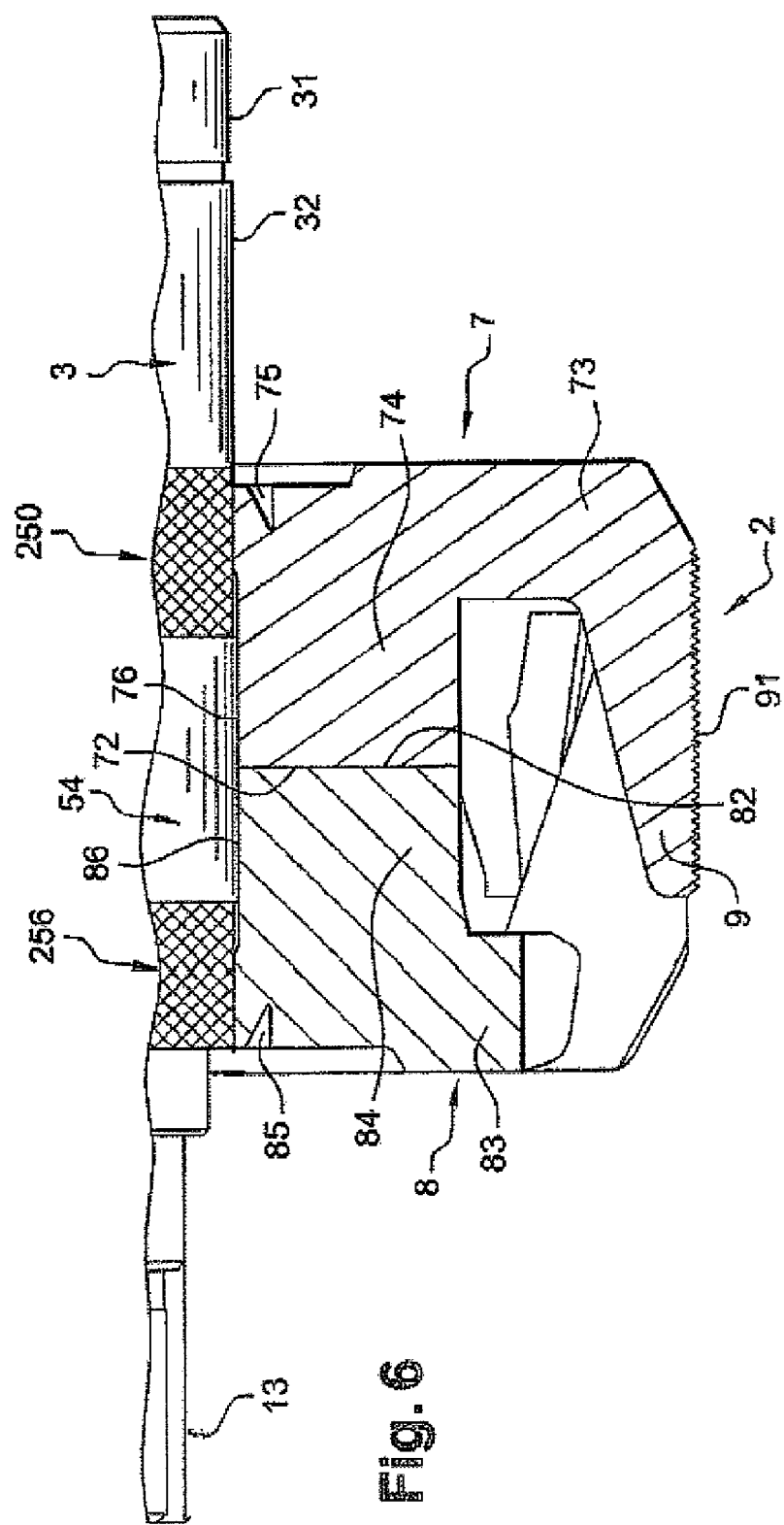
FIG. 6 is a partial view in axial section of the claw-pole rotor, without the excitation winding, equipped with the shaft from FIG. 4 before the operation of crimping the rotor to the crimping areas.

With reference to FIGS. 5 and 6, it is seen that here each crimping area is adapted to cooperate locally with one of the pole wheels.

Here the centring area is smooth.

In these figures the centring area is entirely smooth.

Alternatively, the centring area is divided into at least two smooth centring portions separated from each other by a groove.

For example, in one embodiment, the centring area includes centrally and at each of its axial ends a smooth centring portion separated axially from each other by two grooves, each groove lying between the smooth central portion and one of the smooth end portions.

This area 54 is of circular section cylindrical shape in these embodiments.

The crimping areas are also of circular section.

The outside diameter D1 of the centring area 54 is greater than the outside diameter D2 of the crimping areas with the result that the centring area 54 projects radially relative to the crimping areas.

This area 54 has an axial length L1 greater than that of each crimping area, these areas also being of cylindrical shape.

According to one feature, and as mentioned above, the crimping areas project radially relative to the section 32 of larger radial size of the front end portion of the shaft 3.

Thus in the FIGS. 3 and 4 embodiments, the diameter D1 of the centring area 54 is greater than the larger diameter D3 of the front end portions 32, 31 of the shaft 3 and therefore also that of the rear end portion 13 of the shaft 3.

According to one feature, the diameter D2 is also greater than the diameter D3.

Here it is the second section 32 that has the diameter D3 greater than that of the first threaded section 31.

Thus the shaft from FIGS. 3 and 4 has an intermediate section of radially larger size than the front end portion of the shaft 3 with the result that it is stronger than the shaft of the document DE 30 08 454.

Furthermore, it is easier to machine the crimping areas since their diameter D2 is greater than the diameter D3, here corresponding to the diameter of the second section 32.

Because the diameters D1 and D2 are greater than the diameter D3, this second section 32 for mounting the bearing 19 is not affected when the shaft is mounted in the pole wheels.

The centring area 54 also protects the crimping areas.

In these figures the rear crimping areas 156, 256 adjacent to the rear end portion 13 of the shaft 3 have exactly the same axial length L4, which is less than the length L1 of the area 54.

Here the front crimping areas 150, 250 adjacent to the front end portions 31, 32 of the shaft 3 have an axial length different from that of the rear crimping areas 156, 256.

In the FIG. 3 embodiment the rear crimping area 156 of axial length L4 includes a crimping groove 55 delimited axially, on the one hand, by a flange 57 connecting it to the fifth section 232 of the rear end portion 13 of the shaft 3 and, on the other hand, by a knurled area 56 of diameter D2 connected via the separation groove 62 to the rear axial end of the centring area 54.

The splines of the knurled area 56, produced at the external periphery of the shaft 3, are axially oriented and parallel to the axis X-X of the shaft 3. The axial length L3 of this area 56 is less than the axial length L4 of the area 156 because of the presence of the groove 55.

The diameter of the bottom of the groove 55 is greater than the diameter of the fourth section 232 with the result that the stiffness and the mechanical strength of the rear end portion of the shaft are not modified.

The front crimping area 150 has an axial length L2 greater than the length L4 of the area 156 and less than the length L1 of the area 54. This crimping area 150 is connected to the front end of the centring area 54 by the separation groove 61. This front area 150 is a knurled area of diameter D2 the splines of which, produced at the external periphery of the shaft 3, are axially oriented and parallel to the axis X-X of the shaft 3.

The area 150 is divided into two parts 50, 52 separated from each other by a crimping groove 51.

The axial length of the part 50 is greater than the axial length L3 of the knurled area 56, which is itself greater than the axial length of the part 52.

This knurled part 52 is force-fitted into the internal bore of the spacer 159 from FIG. 1.

The spacer 159 is therefore prevented from rotating by the knurled part 52, which penetrates partly into it as in FIG. 1.

According to one feature the crimping grooves 51, 55 are deeper than the separation grooves 61, 62, with the result that the diameter of the bottom of the grooves 61, 62 is greater than that of the bottom of the crimping grooves, as can be seen in FIGS. 3, 4, 9, 9A, 9B, 9C.

Thus the depth of the crimping grooves 55, 51 is greater than the depths of the splines of the knurled area 156, 150. These grooves are respectively adjacent the area 156 and the part 50.

In FIG. 4 it is seen that the shaft 3 also has a knurled part 152 with axially oriented splines to provide the same function of preventing rotation of the spacer 159.

Following a crimping operation described hereinafter and seen in FIGS. 9, 9A, 9B, the material of the pole wheels 7, 8 flows radially into the respective crimping grooves 51, 55 to fill them and flows partly axially and partly radially into the knurled part 50 and the knurled area 56, respectively.

Thus each pole wheel is immobilised axially by the grooves 51, 55 and in rotation by the knurled part 50 of the area 150 and by the knurled area 56 of the area 156.

Thus the shaft is fastened to the pole wheels by means of the crimping areas 150, 156.

In the FIG. 4 embodiment there are no crimping grooves and the crimping areas consist of a rear knurled crimping area 256, of the same axial length L4 as the area 156, and a front knurled crimping area 250, here of axial length L5 less than the length L4.

The centring area 54 and the grooves 62, 61 are unchanged.

It will be noted that the axial length of the assembly formed by the area 250, the aforementioned knurled part 152 and the groove 151 connecting the area 250 to the part 152 is equal to the length L2 of the area 150 in FIG. 3.

Here the groove 151 is shorter in the axial direction than the groove 51 in FIG. 3, with the result that the area 250 has a length L5 greater than that of the part 50.

The knurled crimping areas 256, 250 have crossed splines.

To be more precise, the splines, which are produced at the external periphery of the shaft 3, are inclined one way and the opposite way so that they cross.

The knurled areas 256, 250 are easier and therefore less costly to produce than the areas 156, 150 in FIG. 3.

During the crimping operation the material of the pole wheels 7, 8 penetrates into these crossed splines, with the result that the pole wheels 7, 8 are immobilised axially and in rotation on the shaft 3 in a simple manner with no crimping grooves. It is easier for the material of the pole wheels 7, 8 to penetrate into the crossed splines.

It will also be noted that the flange 57 from FIG. 3 has been eliminated in FIG. 4, the rear end portion 13 of the shaft 3 being connected to the area 256 by a chamfer of simpler shape than the fillet connecting the flange 57 to the rear end portion 13.

The two embodiments can be combined, of course, and, given that the lengths L4 and L2 are equal, one crimping area of one embodiment replaced by a crimping area of the other embodiment. In FIG. 3, the area 156 can be replaced by the area 256 from FIG. 4, for example. Alternatively, as can be seen in FIG. 10, the flange 57 and the groove 55 can be retained.

In all cases the pole wheels are locally and plastically deformed.

It will be noted that in these FIGS. 3 and 4 the length L1 is greater than the sum of the lengths L2+L4.

The difference between the diameters D1 and D2 varies as a function of the application. It is advantageously small to reduce the crimping forces that are produced by the use of the tools described hereinafter.

This value is between 0.1 and 1 mm, for example.

As emerges from the description, during assembly of the shaft and the wheels 7, 8 the front end portions 31, 32 of the shaft 3 are threaded into the rear end of the rotor 2 to arrive, prior to the crimping operation, at the configurations that can be seen in FIGS. 5 and 6.

In these two embodiments the internal bores of the pole wheels are machined in advance, as is the outside diameter of the pole wheels, i.e. the external periphery of the teeth, to achieve good concentricity between the pole wheels and the shaft and to obtain the required airgap between the rotor and the stator of the machine. This is made possible by the centring area 54, whose external periphery is in intimate contact with the internal periphery of the pole wheels delimited by the central bores of the pole wheels, which here are cylindrical.

This intimate contact produces a centring fit between the diameter of the central bores and the diameter of the centring area.

This machining is carried out using lubricated tools, with no risk of hot swarf being thrown onto the winding 10 from FIG. 1, since no such winding is present at this stage.

Figure 2:
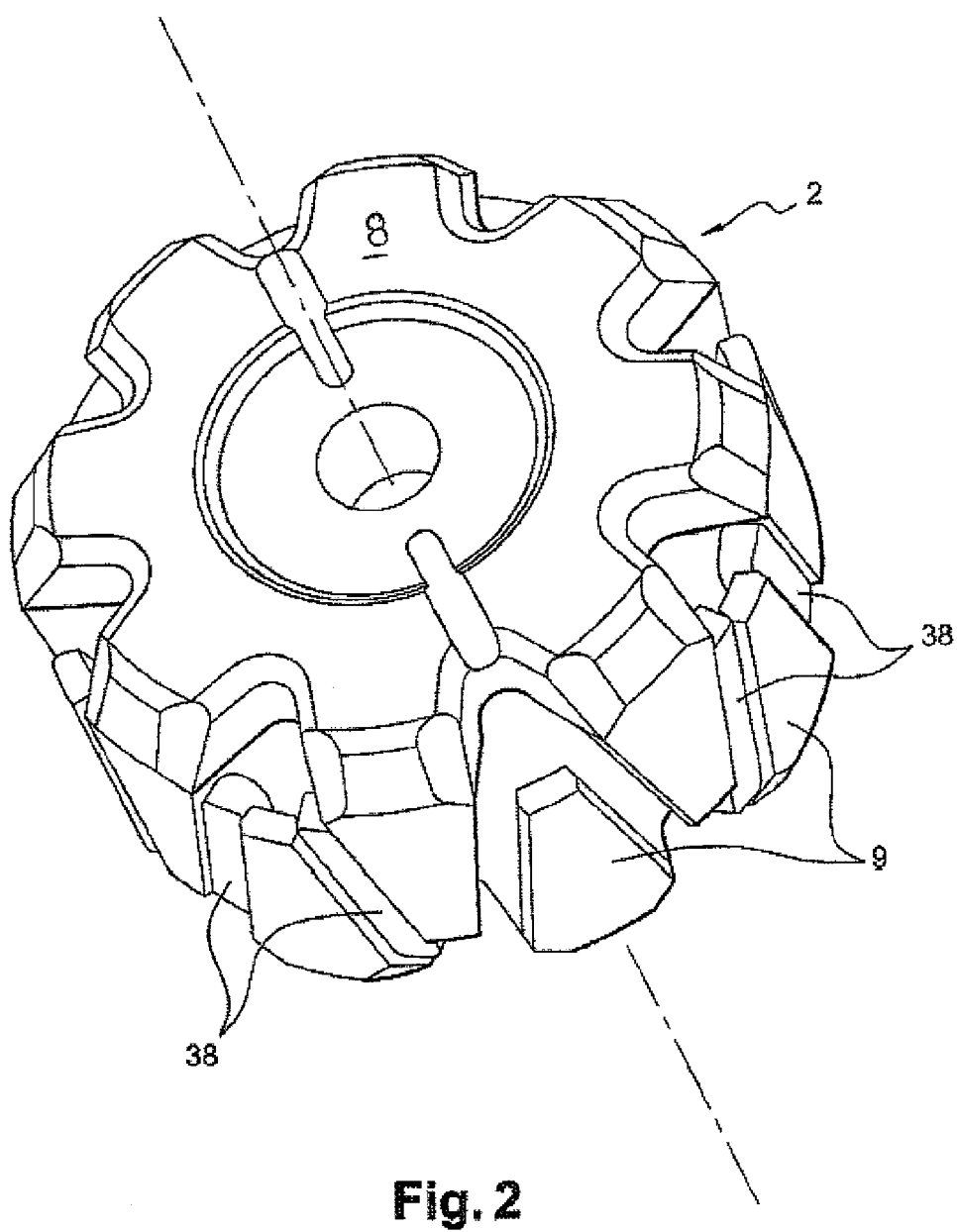
FIG. 2 is a perspective view of a rotor of a rotating electrical machine equipped with permanent magnets to increase the power of the machine.

This also makes it possible, if it is required to increase the power of the machine, to use a milling tool to machine axial grooves in at least one lateral face of at least some of the teeth 9 from FIG. 1 or 2 in order to mount permanent magnets between the teeth as described in the patent FR 2 793 085.

There is no limit on the diameter of this milling tool because at this stage the pole wheels have not yet been assembled together. The same applies to the depths of the grooves.

The grooves can be open or shut.

This enables permanent magnets of different lengths to be mounted.

The milling tool can be lubricated.

Generally speaking, lubricating tools increases their service life.

The winding 10 is then mounted on the core from FIG. 1 consisting of two half-cores, one for the flange of each pole wheel. Then, in particular for good transfer of the magnetic flux, and using a compacting press, the half-cores of the pole wheels, which here are in one piece with the flanges of the pole wheels, are pressed together.

The shaft 3 is then fitted into the central internal bores of the pole wheels. One wheel is also angularly positioned relative to the other, in particular by means of fingers inserted temporarily between the projections of the teeth of the pole wheel concerned, during the compacting or pressing operation.

Referring to FIG. 2, the magnets are mounted in an open or closed groove in one of the teeth of one pole wheel, after which the other pole wheel is offered up, assuming the correct position through magnetic attraction.

Mounting the shaft in the bore of the pole wheels does not disrupt this positioning because it is the centring area 54 that is force fitted in this bore. The same applies when there are no magnets, the angular position not being altered.

The area 54 also protects the sections 32 and 132 for mounting the bearings. These sections are not damaged when the front end portion of the shaft 3 is fed into the central bores of the pole wheels.

FIG. 5 shows the final position of the shaft after this force fitting operation.

Thus there are seen at 83 the transverse flange of the rear pole wheel, at 86 the internal cylindrical central bore of the rear pole wheel 8 and at 84 the half-core of this wheel 8, having an external face 81 facing toward the rear bearing 17 from FIG. 1 and an internal face 82 consisting of the free end of the half-core 84.

Likewise there is seen at 73 the transverse flange of the front pole wheel, at 76 the internal cylindrical central bore of the front pole wheel 7 and at 74 the half-core of that wheel 7 having an external face 71 facing toward the rear bearing 16 from FIG. 1 and an internal face 72 consisting of the free end of the half-core 74. The half-cores 74, 84 are located at the internal periphery of the flanges 73, 83 of the pole wheels 7, 8.

The faces 71 and 81 respectively constitute the front ventral face and the rear dorsal face of the rotor 2 and are oriented transversely relative to the axis X-X of the shaft 3. The faces 71, 81 therefore constitute the axial end faces of the rotor 2.

The faces 72 and 82 are also oriented transversely relative to the axis X-X and are intended to abut against each other as can be seen in FIG. 5 to provide for the transfer of magnetic flux referred to above.

The internal bores of the pole wheels 7, 8, which here are cylindrical, have a shape complementary to that of the centring area 54.

To be more precise, the external periphery of the centring area is in intimate contact with the edge of the bores 82, 76, i.e. with the internal periphery of the pole wheels, whereas the knurled area 56 and the knurled parts 50, 52 do not interfere at this stage with the edges of these bores 86, 76 because the diameter D1 of the centring area 54 is greater than the diameter D2 of this knurled area 56 and these knurled parts 50, 52.

The mechanical stresses are therefore minimal at this stage, compared to the prior art force fitting operation. Moreover accurate concentricity is obtained, as mentioned above, with the result that the external periphery of the wheels can be machined in advance. In the bottom part of FIG. 5 there are shown grooves 91 that can optionally also be produced in advance at the external periphery of the teeth to reduce eddy currents. These grooves 91 are of helicoidal shape in one embodiment. It will be noted that the flange 57 has a diameter slightly greater than that of the knurled area 56 with the result that this flange comes into contact with the pole wheel 8, which limits relative movement of the shaft with respect to the wheels and correctly positions the latter in the axial direction. The same applies to the shaft from FIG. 10. The flange 57 is therefore a simple locating flange and not a load-bearing flange, with the result that it is thin. Its diameter is close to the diameter D1, being slightly greater than the latter so that it can bear on the external face 8 of the wheel 8.

This thin flange 57 is located axially between the collector 100 and the crimping area 156, as can be seen in FIG. 5. To this end, the face 81 has a central recess (no reference number), as can also be seen in FIG. 8.

According to one feature, local deformation of the claw-pole rotor is generated by means of a crimping machine.

Each of the wheels 7, 8 has a respective local annular imprint 75, 85.

In a first embodiment, these imprints are produced in advance, as can be seen in FIGS. 5, 6, 7, in the axial end faces of the pole wheels, i.e. in the external faces 81, 71 of the flanges of the pole wheels.

These imprints are intended to receive the crimping tool 185, which is moved axially while being subjected to a compression force to effect the crimping operation.

Figure 9:
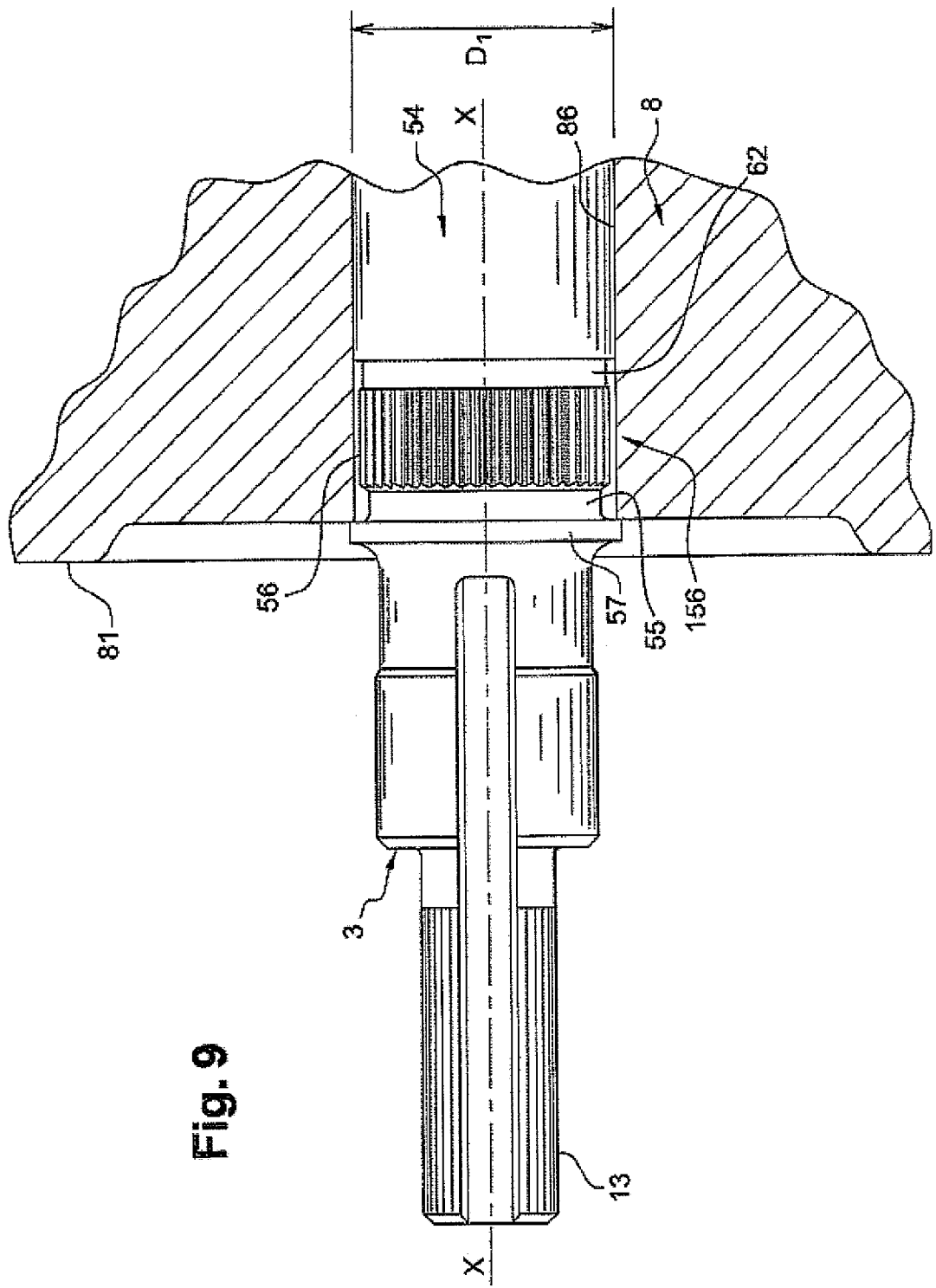
Figure 9A:
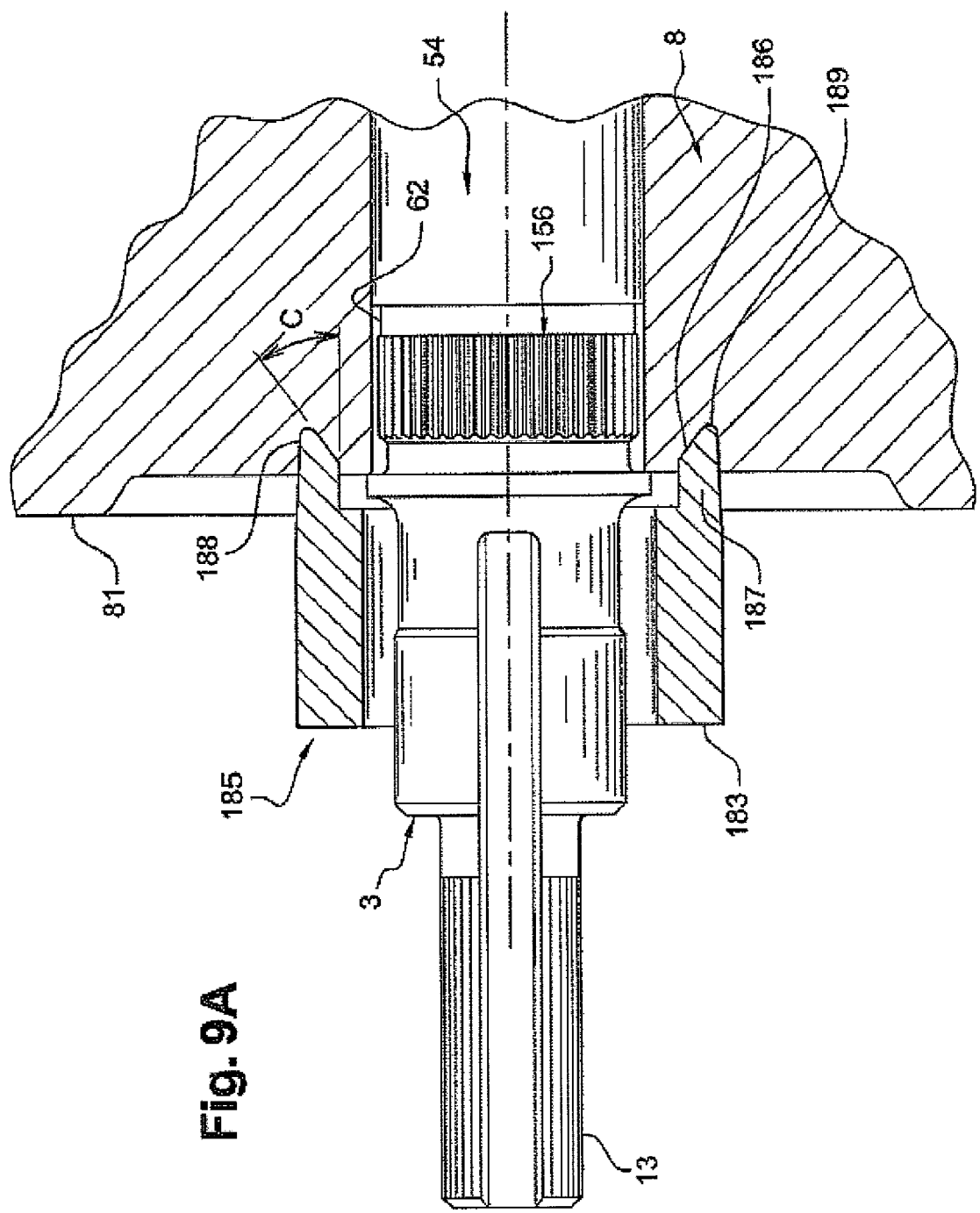

Alternatively, as can be seen in FIGS. 9, 9A, 9B, it is the crimping tool itself that creates the imprint.

The imprints 75, 85 are therefore crimping imprints.

This tool has a tubular shape.

This tool is represented in FIGS. 7, 8, 9, 9A and 9B because it has a special shape.

The tool includes a recess 190 so as not to interfere with the branches 102 of the collector 100, to be more precise with the curved sections connecting the branches to the ring 101.

On the other side of the rotor, i.e. on the face 71, the crimping tool requires no such clearance. In all cases, the tubular tool 185 has an annular free front end 187 conformed as a leading edge to penetrate into the imprint 75, 85 concerned or to form that imprint.

This front end includes internally a face 186 of frustoconical shape and externally an external face 188 also of frustoconical shape, connected to the internal face 186 by a rounded edge 189, as can be seen more clearly in FIG. 9A.

Considering the front end portion of the tool, intended to cooperate with the pole wheel 7, 8 concerned, it is seen that at the front the face 186 is divergent toward the outside of the tool, i.e. flared, whereas the face 188 is inclined in the opposite direction and at the front converges toward the centre of the tool.

The imprints 75, 85, which are of complementary shape to the tool 185, each include, as can be seen more clearly in FIG. 9B, an inner edge 286 connected by a portion 289 of rounded shape to an outer edge 288.

The edges 286, 288 have a shape complementary to that of the faces 186, 188 connected to each other via a rounded edge 289 of the free end of the tool 185. The frustoconical edge 286 is inclined in the direction of the axis X-X and converges toward that axis externally of the rotor 2, whereas the edge 288 diverges externally of the rotor.

The cooperation of the tool 185 with the imprint 85 can be seen more clearly in FIG. 9A.

The tool 185 is moved axially while subjected to a compression force and causes material, here the material of the rear pole wheel 8, to flow axially and radially inward, given the inclination of the face 186 and the edge 286, with plastic deformation of the material.

The final result can be seen in FIG. 9B, the material flowing radially into the groove 55 and radially and axially inward in the knurled area 56 with the result that immobilisation in rotation is obtained by the knurled area 56 and in translation is obtained by the groove 55.

The same applies to the front crimping area 150, the material of the pole wheel 7, because of the effect of the axial movement of the crimping tool engaged in the imprint 85, flowing radially inward into the groove 51 and radially and axially inward into the knurled area 50, with the result that immobilisation in rotation is obtained via the knurled part 50 and in translation via the groove 51.

The same effect is obtained in FIG. 6, the axial displacement of the tool engaged in the imprint 85 and in the imprint 75, respectively, causing axial and radial inward flow of the material in the crimping area 256 and in the crimping area 250, respectively. These areas having crossed splines, immobilisation of the pole wheels on the shaft 3 is obtained in translation and in rotation.

It will be noted that the free end 187 of the tool is produced by a change of diameter delimited by a transverse shoulder 184 (FIG. 9A). This end 187 is thin compared to the main part 183 of the tool of larger inside diameter than the flange 57. The rear face of this tool is subjected to the action of a pressure member to deform the pole wheel concerned locally, via its free end.

In FIG. 9A, when it is the tool that creates the imprint, there are obtained in reality two annular sectors of flow of the material of the axial end 81 of the pole wheel 8 because of the recess 190 in the tool for the arm of the collector.

The same applies to the face 71 if the same tool is used.

Alternatively, the tool 185 has no such recess in the axial end face 71, with the result that a continuous ring of flow of material is obtained.

The imprints can therefore be divided into two annular sectors.

Of course, the free end 187 can alternatively be divided into a plurality of annular sectors.

In this embodiment the angle c (FIG. 9A) of the face 186 is between 20° and 45°, and advantageously between 30° and 38°.

The angle of the frustoconical face 188 is small. This angle is between 1° and 5°, for example.

The value of these angles depends on the application, of course.

It will be noted that in FIG. 8 the rear fan 24 from FIG. 1 has not yet been mounted and that the inside diameter of this fan is greater than that of the ring 101.

Generally speaking, the crimping imprints 75, 85 are located inside the central hole of the fan concerned, with the result that they are not modified.

These imprints 75, 85 are close to the internal periphery of the pole wheels 7, 8. They are located radially above and adjacent to the crimping areas.

The present invention also retains the same configuration of the pole wheels, only their cylindrical internal bore being modified.

The collector 100, the spacer 159 and the front and rear end portions of the shaft are also retained.

Of course, if the front end of the shaft 3 is threaded into the bore of the pole wheels, the rear end of the shaft can alternatively be modified.

This rear end portion can therefore have a radial size greater than or equal to that of the front end portion.

In all cases the radial size of the intermediate portion is greater than that of the front end portion.

The present invention is not limited to the embodiments described, of course.

Thus the alternator can be of the brushless type, (see for example the document FR 2 744 575).

In this case the rear bearing has a deep shape and the claw-pole rotor consists of a staggered main pole wheel and a cantilever pole wheel that are fixed to each other by an amagnetic material ring. This ring connects to each other the interleaved teeth of the two pole wheels.

The core is fixed and is attached to the rear face of the front bearing, forming a cover for the rear bearing.

One of the pole wheels therefore has no flange, while the other main pole wheel is assembled with the shaft of the invention, each of the crimping areas being located at one axial end of the main pole wheel.

In the light of the above document, it is seen that the electronic components can be carried by the front bearing and that a single fan can be mounted at the rear end of the shaft.

Alternatively, the alternator constitutes the excitation alternator of an electromagnetic retarder.

In this case, it suffices to reverse the structures (see document WO 2004/017502).

In these embodiments the axial length of the crimping areas is less than the thickness of the flanges 73, 83 of the pole wheels. This depends on the application, of course.

It will be noted that the crimping areas are axially longer than those of the document DE 300 84 54.

In one embodiment an intermediate core can be located between the two pole wheels, being separate from them.

For example, in FIG. 5 the half-cores 74, 84 can be axially shortened and a separate intermediate core placed between them.

This core will be centred, along with the pole wheels, by the centring area.

This centring area is not necessarily smooth.

Alternatively, it has projecting points or contact areas, for example, formed in the groove for contact with the edge of the bores.

Generally speaking, to achieve intimate centring contact, the radial size of the internal bore corresponds to that of the centring area.

A fit is obtained between the shaft and the main pole wheel or the pole wheels.

Thus in FIGS. 3 to 6 the inside diameter of the bores 76, 86 of the half-cores 74, 84 fits the diameter D1 of the centring area 54.

It will be realised that the mechanical strength of the shaft of the invention is higher than the mechanical strength of the shaft of the document DE 300 84 54 because in the present invention the diameter D2 of the crimping areas is less than the diameter D1 of the centring area and is greater than the larger diameter D3 of the front end portion 31, 32 of the shaft 3, whereas in the document DE 300 84 54 the larger diameter of the front end portion of the shaft is greater than the diameter D2 of the crimping areas.

Furthermore, in the document DE 300 84 54, the larger diameter of the smooth part of the shaft is constant, with the result that there is a risk of the bearing mounting areas being damaged when fitting the pole wheels to the shaft.

In the present invention this cannot happen because there is a radial clearance between the central bores of the pole wheels and the larger diameter D3 of the front end portion of the shaft, knowing that the front end of the shaft is threaded into the rear end of the claw-pole rotor.

In the document DE 300 84 54, mechanical wear of the slip rings in contact with the brushes of the brush support is greater because the larger diameter of the smooth part of the tree is constant, whereas, thanks to the invention, and in the aforementioned manner, the rear end portion of the shaft is of smaller diameter so that the diameter of the slip rings and mechanical wear are reduced.

The invention increases the axial length of the crimping areas relative to those of the document DE 300 84 54 whilst providing a centring area of great axial length.

Thus accurate concentricity of the pole wheels with respect to the shaft is achieved in combination with robust and reliable assembly of the pole wheels to the shaft.

Machining the crimping areas is easier and more economical than machining the crimping areas of the document DE 300 84 54.

The crimping forces are also reduced.

It will be realised that a crimping area in the form of a knurled area with crossed splines is of lower cost and produces a greater axial strength of the assembly of the pole wheels to the shaft because good penetration of the material of the pole wheel concerned into the splines is achieved.

Thanks to the projecting centring area, accurate concentricity between the pole wheels and the shaft is achieved.

The invention claimed is:

1. A shaft (3) for a claw-pole rotor (2), comprising:
   a front end portion with a plurality of sections (31, 32), one of the sections being of radially larger size;
   a rear end portion; and
   an intermediate section for supporting and fixing the claw-pole rotor;
   the intermediate section having two knurled crimping areas (150, 156-250, 256) adapted to be assembled with the claw-pole rotor (2) by local deformation of the material of the claw-pole rotor (2), and a centring area (54) between the crimping areas (150, 156-250, 256) adapted to centre the claw-pole rotor and projecting radially relative to the crimping areas;
   the crimping areas (150, 156-250, 256) projecting radially relative to the section (32) of the front end portion of the shaft (3) of radially larger size;
   each crimping area (150, 156-250, 256) being separated from the centring area (54) by a separation groove (61, 62);
   the centring area (54) having an axial length (L1) greater than that of each of the crimping areas (150, 156-250, 256).

2. The shaft according to claim 1, wherein one of the crimping areas (150, 250) is divided into two parts (50, 52) separated by a crimping groove (51, 151).

3. The shaft according to claim 1, wherein one of the crimping areas (156, 256) is delimited by a flange adapted to bear on the claw-pole rotor (2).

4. The shaft according to claim 1, wherein at least one of the crimping areas (150, 156) includes a knurled area (56, 150) with axially-oriented splines and a crimping groove (55, 51) formed on the intermediate section.

5. The shaft according to claim 1, wherein at least one of the crimping areas (250, 256) includes a knurled area with crossed splines.

6. The shaft according to claim 5, wherein each crimping area (250, 256) includes a knurled area with crossed splines.

7. The shaft according to claim 1, wherein the crimping areas (150, 156-250, 256) have different axial lengths.

8. The shaft according to claim 1, wherein the axial length (L1) of the centring area (54) is greater than the sum of the lengths (L2+L4) of the two crimping areas (150, 156-250, 256).

9. The shaft according to claim 1, wherein the centring area (54), the crimping areas (150, 156-250, 256) and the section (32) of the front end portion of the shaft (3) of radially larger size are of circular section, the diameter (D1) of the centring area (54) is greater than the diameter (D2) of the crimping areas (150, 156-250, 256) and the diameter (D2) of the crimping areas (150, 156-250, 256) is greater than the diameter (D3) of the section (32) of the front end portion of the shaft (3) of radially larger size.

10. The shaft according to claim 1, wherein the centring area (54) is smooth.

11. A shaft for a claw-pole rotor, comprising:
    a front end portion with a plurality of sections, one of the sections being of radially larger size;
    a rear end portion; and
    an intermediate section for supporting and fixing the claw-pole rotor;
    the intermediate section having two knurled crimping areas (150, 156-250, 256) adapted to be assembled with the claw-pole rotor (2) by local deformation of the material of the claw-pole rotor (2), and a centring area (54) between the crimping areas (150, 156-250, 256) adapted to centre the claw-pole rotor and projecting radially relative to the crimping areas;
    the crimping areas (150, 156-250, 256) projecting radially relative to the section (32) of the front end portion of the shaft (3) of radially larger size;
    each crimping area (150, 156-250, 256) being separated from the centring area (54) by a separation groove (61, 62);
    at least one of the crimping areas (150, 156) including a knurled area (56, 150) with axially-oriented splines and a crimping groove (55, 51) formed on the intermediate section;
    each of the crimping areas (150, 156-250, 256) being separated from the centring area (54) by a separation groove (61, 62) formed on the intermediate section;
    the crimping groove (51, 55) and the separation groove (61, 62) being of circular section and the diameter of the bottom of the separation groove (61, 62) being greater than the diameter of the bottom of the crimping groove (51, 55).

12. A shaft for a claw-pole rotor, comprising:
    a front end portion with a plurality of sections, one of the sections being of radially larger size;
    a rear end portion; and
    an intermediate section for supporting and fixing the claw-pole rotor;

the intermediate section having two knurled crimping areas (150, 156-250, 256) adapted to be assembled with the claw-pole rotor (2) by local deformation of the material of the claw-pole rotor (2), and a centring area (54) between the crimping areas (150, 156-250, 256) adapted to centre the claw-pole rotor and projecting radially relative to the crimping areas;

the (150, 156-250, 256) projecting radially relative to the section (32) of the front end portion of the shaft (3) of radially larger size;

each crimping area (150, 156-250, 256) being separated from the centring area (54) by a separation groove (61, 62);

at least one of the crimping areas (250, 256) including a knurled area with crossed splines;

one of the crimping areas (250) being connected to a knurled part with axially-oriented splines via a connecting groove (151).

13. A shaft for a claw-pole rotor, comprising:
a front end portion with a plurality of sections one of the sections being of radially larger size;
a rear end portion; and
an intermediate section for supporting and fixing the claw-pole rotor;
the intermediate section having two knurled crimping areas (150, 156-250, 256) adapted to be assembled with the claw-pole rotor (2) by local deformation of the material of the claw-pole rotor (2), and a centring area (54) between the crimping areas (150, 156-250, 256) adapted to centre the claw-pole rotor and projecting radially relative to the crimping areas;
the crimping areas (150, 156-250, 256) projecting radially relative to the section (32) of the front end portion of the shaft (3) of radially larger size;
each crimping area (150, 156-250, 256) being separated from the centring area (54) by a separation groove (61, 62);
the centring area (54), the crimping areas (150, 156-250, 256) and the section (32) of the front end portion of the shaft (3) of radially larger size being of circular section;
the diameter (D1) of the centring area (54) being greater than the diameter (D2) of the crimping areas (150, 156-250, 256) and the diameter (D2) of the crimping areas (150, 156-250, 256) being greater than the diameter D3 of the section (32) of the front end portion of the shaft (3) of radially larger size;
the difference in diameter (D1-D2) between the centring area (54) and the crimping areas (150, 156-250, 256) being between 0.1 mm and 1 mm.

14. A claw-pole rotor in combination with a shaft supporting the claw-pole rotor so that the claw-pole rotor being fixedly secured thereon, the shaft including:
a front end portion with a plurality of sections (31, 32), one of the sections being of radially larger size;
a rear end portion; and
an intermediate section for supporting and fixing the claw-pole rotor;
the intermediate section having two knurled crimping areas (150, 156-250, 256) assembled with the claw-pole rotor (2) by local deformation of the material of the claw-pole rotor (2), and a centring area (54) between the crimping areas (150, 156-250, 256) centring the claw-pole rotor and projecting radially relative to the crimping areas;
the crimping areas (150, 156-250, 256) projecting radially relative to the section (32) of the front end portion of the shaft (3) of radially larger size;
each crimping area (150, 156-250, 256) being separated from the centring area (54) by a separation groove (61, 62);
the centring area (54) having an axial length (L1) greater than that of each crimping area (150, 156-250, 256).

15. A claw-pole rotor in combination with a shaft supporting the claw-pole rotor so that the claw-pole rotor being fixedly secured thereon, the shaft including:
a front end portion with a plurality of sections (31, 32), one of the sections being of radially larger size;
a rear end portion; and
an intermediate section for supporting and fixing the claw-pole rotor;
the intermediate section having two knurled crimping areas (150, 156-250, 256) assembled with the claw-pole rotor (2) by local deformation of the material of the claw-pole rotor (2), and a centring area (54) between the crimping areas (150, 156-250, 256) centring the claw-pole rotor and projecting radially relative to the crimping areas;
the crimping areas (150, 156-250, 256) projecting radially relative to the section (32) of the front end portion of the shaft (3) of radially larger size;
the claw-pole rotor including a crimping imprint (75, 85) at each of axial ends (71, 81) thereof.

16. The rotor according to claim 15, wherein at least one (85) of the imprints (75, 85) is divided into two annular sectors.

17. The rotor according to claim 15, wherein at least one of the imprints (75, 85) is of annular shape.

18. The rotor according to claim 15, wherein the imprints are delimited by an inner edge (286) inclined toward an axis X-X of the shaft (3).

19. The rotor according to claim 18, wherein an angle of inclination of the inner edge is between 20° and 45°.

20. A claw-pole rotor in combination with a shaft supporting the claw-pole rotor so that the claw-pole rotor being fixedly secured thereon, the shaft including:
a front end portion with a plurality of sections (31, 32), one of the sections being of radially larger size;
a rear end portion; and
an intermediate section for supporting and fixing the claw-pole rotor;
the intermediate section having two knurled crimping areas (150, 156-250, 256) assembled with the claw-pole rotor (2) by local deformation of the material of the claw-pole rotor (2), and a centring area (54) between the crimping areas (150, 156-250, 256) centring the claw-pole rotor and projecting radially relative to the crimping areas;
the crimping areas (150, 156-250, 256) projecting radially relative to the section (32) of the front end portion of the shaft (3) of radially larger size;
each crimping area (150, 156-250, 256) being separated from the centring area (54) by a separation groove (61, 62);
the rotor further comprising two pole wheels (7, 8) each including a flange carrying at its external periphery a plurality of teeth (9) and at its internal periphery a half-core (74, 84) and the half-cores (74, 84) being juxtaposed.

21. A rotary electrical machine, comprising:
a claw-pole rotor; and
a shaft supporting the claw-pole rotor so that the claw-pole rotor being fixedly secured thereon;

the shaft including:
    a front end portion with a plurality of sections (31, 32), one of the sections being of radially larger size;
    a rear end portion; and
    an intermediate section for supporting and fixing the claw-pole rotor;
    the intermediate section having two knurled crimping areas (150, 156-250, 256) adapted to be assembled with the claw-pole rotor (2) by local deformation of the material of the claw-pole rotor (2), and a centring area (54) between the crimping areas (150, 156-250, 256) adapted to centre the claw-pole rotor and projecting radially relative to the crimping areas;
    the crimping areas (150, 156-250, 256) projecting radially relative to the section (32) of the front end portion of the shaft (3) of radially larger size;
    each crimping area (150, 156-250, 256) being separated from the centring area (54) by a separation groove (61, 62);
    the centring area (54) having an axial length (L1) greater than that of each crimping area (150, 156-250, 256).

22. The rotary electrical machine according to claim 21, wherein said rotating electric machine defines an alternator or an alternator-starter.

\* \* \* \* \*